(12) United States Patent
Takahashi et al.

(10) Patent No.: US 9,471,178 B2
(45) Date of Patent: Oct. 18, 2016

(54) ELECTRONIC DEVICE, METHOD, AND PROGRAM FOR SUPPORTING TOUCH PANEL OPERATION

(71) Applicant: KYOCERA Document Solutions Inc., Osaka (JP)

(72) Inventors: Minoru Takahashi, Osaka (JP); Ryosuke Ogishi, Osaka (JP); Tsuyoshi Nitta, Osaka (JP); Masato Tanba, Osaka (JP)

(73) Assignee: KYOCERA Document Solutions Inc. (JP)

( * ) Notice: Subject to any disclaimer, the term of this patent is extended or adjusted under 35 U.S.C. 154(b) by 61 days.

(21) Appl. No.: 14/600,151

(22) Filed: Jan. 20, 2015

(65) Prior Publication Data

US 2015/0205437 A1    Jul. 23, 2015

(30) Foreign Application Priority Data

Jan. 23, 2014  (JP) ................................ 2014-010050
Mar. 17, 2014  (JP) ................................ 2014-053325

(51) Int. Cl.
*G06F 3/041*    (2006.01)
*G06F 3/01*     (2006.01)

(52) U.S. Cl.
CPC ............. *G06F 3/0418* (2013.01); *G06F 3/013* (2013.01); *G06F 3/0412* (2013.01)

(58) Field of Classification Search
CPC .... G06F 3/0418; G06F 3/013; G06F 3/0412; G06F 3/041–3/047; G06F 2203/04101–2203/04113
USPC ......... 345/173–178; 178/18.01–18.09, 18.11
See application file for complete search history.

(56) References Cited

U.S. PATENT DOCUMENTS

| | | | |
|---|---|---|---|
| 5,189,732 A | 2/1993 | Kondo | |
| 2009/0141895 A1* | 6/2009 | Anderson | ............... G06F 21/84 380/252 |
| 2011/0285657 A1 | 11/2011 | Shimotani et al. | |

(Continued)

FOREIGN PATENT DOCUMENTS

| | | |
|---|---|---|
| JP | 2009-110275 A | 5/2009 |
| JP | 2010-160274 A | 7/2010 |
| JP | 2013-222438 A | 10/2013 |

OTHER PUBLICATIONS

Office Action dated Apr. 5, 2016 from the Japanese Patent Office re Japanese Patent Appl. No. 2014-010050.

*Primary Examiner* — Stephen Sherman
(74) *Attorney, Agent, or Firm* — McDonnell Boehnen Hulbert & Berghoff LLP

(57) ABSTRACT

An electronic device includes a touch panel that detects operation point coordinates of touch input by a user and a line-of-sight detection section that calculates the coordinates of a gaze point on the touch panel at which a line of sight of the user is directed in a specific time range from a time point of the touch input on the touch panel by the user. The electronic device further includes a line-of-sight correction area calculation section that calculates a line-of-sight correction area in a specific range from the coordinates of the gaze point on the touch panel. The electronic device also includes an operation coordinate line-of-sight correction section that a) changes the operation point coordinates to the coordinates of the gaze point if the operation point coordinates are within the line-of-sight correction area; and b) does not change the operation point coordinates if the operation point coordinates are not within the line-of-sight correction area.

15 Claims, 11 Drawing Sheets

(56) References Cited

U.S. PATENT DOCUMENTS

| | | | | |
|---|---|---|---|---|
| 2012/0242591 A1* | 9/2012 | Kawalkar | ........... | G06F 3/04886 345/173 |
| 2013/0307797 A1* | 11/2013 | Taguchi | ................. | A61B 3/113 345/173 |
| 2014/0285418 A1* | 9/2014 | Adachi | .................... | G06F 3/013 345/156 |

* cited by examiner

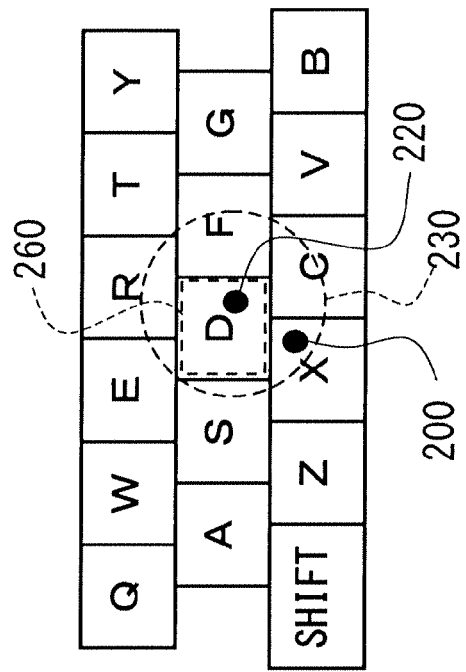
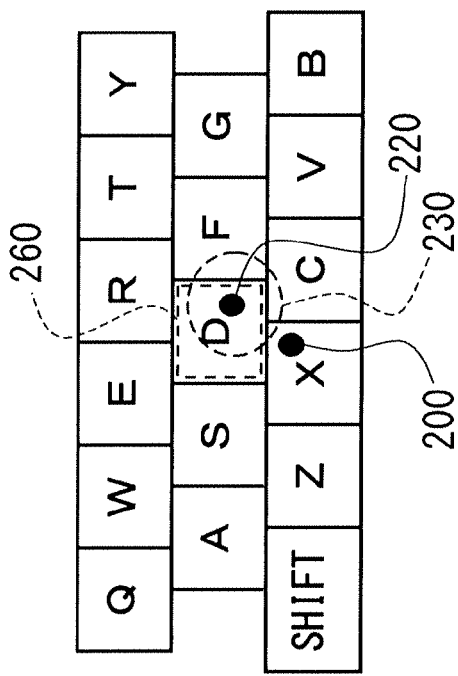

ELECTRONIC DEVICE, METHOD, AND PROGRAM FOR SUPPORTING TOUCH PANEL OPERATION

REFERENCE TO RELATED APPLICATIONS

This application is based upon and claims the benefit of priority from the corresponding Japanese Patent Application No. 2014-010050, filed in the Japan Patent Office on Jan. 23, 2014 and the corresponding Japanese Patent Application No. 2014-053325, filed in the Japan Patent Office on Mar. 17, 2014, the entire contents of which are incorporated herein by reference.

FIELD

The present disclosure relates to an electronic device, a method, and a program for supporting touch panel operation.

BACKGROUND

A typical electronic device is provided with a touch panel by which instructions on the graphical user interface ("GUI") of a display section are given by touch input. In a touch panel, operational mistakes sometimes occur in which a user mistakenly touch inputs on a different place from where the user intended to do so. If an operational mistake occurs, it becomes necessary to cancel the instruction, and to perform the correct touch input.

A typical electronic device is capable of displaying with an expanded part of a software keyboard that corresponds to a line of sight. The part to be displayed is expanded by the line of sight so that information to be displayed is reduced.

SUMMARY

An electronic device according to an embodiment of the present disclosure includes a touch panel, a line-of-sight detection section, a line-of-sight correction area calculation section, and an operation coordinate line-of-sight correction section. The touch panel detects the coordinates of an operation point of touch input by a user. The line-of-sight detection section calculates the coordinates of a gaze point on the touch panel at which the line of sight of the user was directed during a specific time range from a time point of the touch input on the touch panel by the user. The line-of-sight correction area calculation section calculates a line-of-sight correction area in a specific range from the coordinates of the gaze point, calculated by the line-of-sight detection section, on the touch panel. The operation coordinate line-of-sight correction section changes the coordinates of the operation point to the coordinates of the gaze point if the coordinates of the operation point are within the line-of-sight correction area calculated by the line-of-sight correction area calculation section, and does not to change the coordinates of the operation point if the coordinates of the operation point are not within the line-of-sight correction area.

A method of supporting operation according to an embodiment of the present disclosure includes: (i) detecting, via a touch panel, coordinates of an operation point of touch input by a user; (ii) calculating, via a line-of-sight detection section, coordinates of a gaze point on the touch panel at which a line of sight of the user is directed during a specific time range from a time point of the touch input on the touch panel by the user; (iii) calculating, via a line-of-sight correction area calculation section, a line-of-sight correction area in a specific range from the coordinates of the gaze point, calculated by the line-of-sight detection section, on the touch panel; and (iv) changing, via an operation coordinate line-of-sight correction section, the coordinates of the operation point to the coordinates of the gaze point if the coordinates of the operation point are within the line-of-sight correction area calculated by the line-of-sight correction area calculation section, and not changing the coordinates of the operation point if the coordinates of the operation point are not within the line-of-sight correction area.

A non-transitory computer-readable recording medium according to an embodiment of the present disclosure stores an operation support program executable by a computer. The operation support program includes first to fourth program codes. The first program code causes the computer to detect coordinates of a touch input operation point on a touch panel by a user. The second program code causes the computer to calculate coordinates of a gaze point on the touch panel at which a line of sight of the user is directed during a specific time range from a time point of the touch input on the touch panel by the user. The third program code causes the computer to calculate a line-of-sight correction area in a specific range from the coordinates of the gaze point, calculated by the second program code, on the touch panel. The fourth program code causes the computer to change the coordinates of the operation point to the coordinates of the gaze point if the coordinates of the operation point are within the line-of-sight correction area calculated by the third program code, and not to change the coordinates of the operation point if the coordinates of the operation point are not within the line-of-sight correction area.

Additional features and advantages are described herein, and will be apparent from the following detailed description and the figures.

BRIEF DESCRIPTION OF THE DRAWINGS

All drawings are intended to illustrate some aspects and examples of the present disclosure. The drawings described are only schematic and are non-limiting, and are not necessarily drawn to scale.

FIG. 9A and FIG. 9B illustrate a concept of the line-of-sight correction area expansion processing illustrated in FIG. 8;

DETAILED DESCRIPTION

Figure 1:
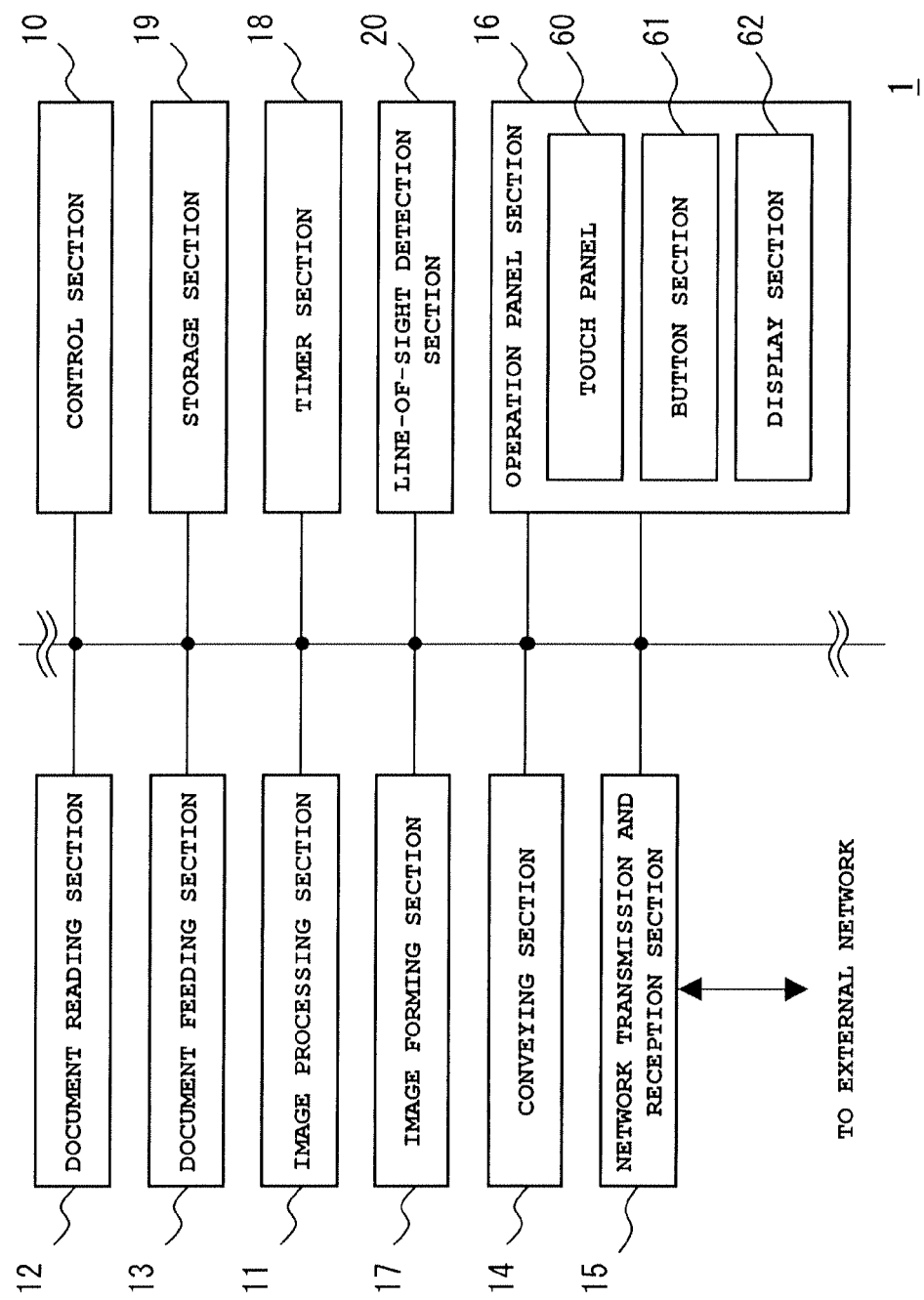
FIG. 1 illustrates an overall configuration of an image forming apparatus according to an embodiment of the present disclosure.

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

First Embodiment

First, a description will be given of an overall configuration of an electronic device according to the present disclosure with reference to FIG. 1 and FIG. 2.

An image forming apparatus 1 is an example of an electronic device according to an embodiment of the present disclosure. In the image forming apparatus 1, an image processing section 11, a document reading section 12, a document feeding section 13, a conveying section 14, a network transmission and reception section 15, an operation panel section 16, an image forming section 17, a timer section 18, a storage section 19, and a line-of-sight detection section 20 are connected to a control section 10. Operation of each section is controlled by the control section 10.

The control section 10 is an information processing device, such as a GPP (General Purpose Processor), a CPU (Central Processing Unit), an MPU (Micro Processing Unit), a DSP (Digital Signal Processor), a GPU (Graphics Processing Unit), an ASIC (Application Specific Integrated Circuit), or the like.

The control section 10 reads a control program stored in a ROM (Read Only Memory) or a HDD (Hard Disk Drive) in the storage section 19, and expands and executes the control program in a RAM (Random Access Memory) so as to operate each section of the functional blocks described later. Also, the control section 10 controls the overall apparatus based on instruction information input from an external terminal, or the operation panel section 16.

The image processing section 11 is a control operation device, such as a DSP (Digital Signal Processor), a GPU (Graphics Processing Unit), or the like. The image processing section 11 is a device that performs image processing on image data, and performs various kinds of image processing, for example, expansion/contraction, density adjustment, gray scale adjustment, image improvement, and the like.

The image processing section 11 stores an image read by the document reading section 12 into the storage section 19 as print data. At this time, the image processing section 11 is capable of converting print data into a format, such as PDF, TIFF, or the like, for each file.

The document reading section 12 is a scanner that reads a set document.

The document feeding section 13 is a device that conveys a document that is read by the document reading section 12.

The conveying section 14 conveys recording paper from a paper feeding cassette, then image forming is performed on the paper by the image forming section 17, and after that, the paper is conveyed to a stack tray.

The network transmission and reception section 15 is a network connecting device including a LAN board, a radio transmitter/receiver, and the like for connecting to an external network, such as a LAN, a wireless LAN, a WAN, a mobile phone network, or the like.

The network transmission and reception section 15 transmits and receives data through a data communication line, and transmits and receives an audio signal through a voice telephone line.

The operation panel section 16 includes a touch panel 60, a button section 61, and a display section 62.

The touch panel 60 is a touch input device of an electrostatic capacitance method, a resistive film method, an ultrasonic detecting method, or the like for obtaining an instruction such as coordinates and the like, at which a user performs an operation by pressing a finger (hereinafter referred to as "touch input"). Also, the touch panel 60 may be configured integrally with the display section 62.

The touch panel 60 obtains various instructions from a user through a GUI (Graphical User Interface), or the like. Specifically, the touch panel 60 detects the coordinates of touch input by the user as an operation point. The touch panel 60 may detect that the operation point falls on coordinates corresponding to the coordinates on the display section 62 at this time.

In this regard, if the touch panel 60 is multi-touch enabled, a plurality of coordinates may be detected. Also, the touch panel 60 may detect coordinates that are input by a pen point, such as a dedicated pen, or the like. Also, the touch panel 60 may detect pressing force applied by the user. Also, if the touch panel 60 is of an electrostatic capacitance method, an ultrasonic method, or the like, the touch panel 60 may detect coordinates on the display section 62 as an operation point even if untouched by the user's finger. In this case, the touch panel 60 may detect the user's finger a distance from the display section 62.

The button section 61 is an input device such as a mechanical switch, an electrostatic capacitance switch, or the like. The button section 61 includes a start key, a numeric keypad, a button for changing an operation mode of a copy, a scanner, facsimile transmission/reception, and the like, and a button obtaining an instruction related to print/transmission/reception, and the like, of a selected document.

The display section 62 is a flat display panel, such as an LCD (Liquid Crystal Display), an GELD (Organic Electro-Luminescence Display), an FED (Field Emission Display), or the like, or is a display device, such as a projector, a status display LED, or the like. The display section 62 displays various operation screens.

The display section 62 is capable of displaying various images of GUI. Also, the display section 62 is capable of displaying a software keyboard for a user to input characters, and the like on the touch panel 60. The display section 62 is also capable of displaying the coordinates of an operation point that was changed or not changed by the operation coordinate line-of-sight correction section described later. In this regard, the display section 62 is capable of displaying a preview image, or the like, that is stored in the storage section 19.

The timer section 18 is a time acquisition device, such as a CPU internal clock, a real-time clock, a GPS (Global Positioning System) receiver, an NTP client, or the like. The timer section 18 is capable of obtaining real-time clock information having less error.

Also, the timer section 18 is capable of setting a timer that generates an interrupt, or the like, after the elapse of a set time period.

The image forming section 17 forms an image on recording paper from data that is stored in the storage section 19, read by the document reading section 12, or obtained from an external terminal by an output instruction of a user.

The storage section 19 is a semiconductor memory, such as a ROM, a RAM or the like, or a storage device using a recording medium, such as an HDD, or the like.

The ROM or the HDD in the storage section 19 stores a control program for performing operation control on the image forming apparatus 1. In addition to this, the storage section 19 stores the settings of user accounts. Also, the storage section 19 may include an area, such as a document box for each user, and the like.

The line-of-sight detection section 20 is a line-of-sight detection device including a plurality of cameras, a DSP, and the like, for example. FIG. 2 illustrates an example of an outer view of the operation panel section 16, and the line-of-sight detection section 20 of the image forming apparatus 1.

The line-of-sight detection section 20 detects, for example, a user's face and eyes from the captured image data, and further calculates a line of sight in a three-dimensional vector format, or the like. The line-of-sight detection section 20 calculates the coordinates (hereinafter referred to as "gaze point coordinates") of an intersection point between the user's line of sight and the touch panel 60, and sets the coordinates in the gaze point. At this time, the line-of-sight detection section 20 calculates the average values of gaze point coordinates, or the coordinates having the longest gaze time as the coordinates of a gaze point 220 in a time range 210 before and after a time point of touch input by the user on the touch panel 60. Also, the line-of-sight detection section 20 may calculate the value of a gaze probability, or the like, that is a calculation of the probability of a gaze point from a gaze time of each gaze point coordinates, a movement vector of the gaze point coordinates, the variance of gaze point coordinates, and the like.

In this regard, the time range is set to a shorter value than a time period during touch input before and after the target touch input. The touch input intervals have differences among individuals. Accordingly, the average value of the intervals of touch input is measured when a user uses the operation panel section 16, and a time range for each user may be determined based on the measured value. For example, the time range may be the average value of touch input intervals, or may be a value produced by dividing the average value by a certain value.

Also, it is possible to dispose the line-of-sight detection section 20 in the operation panel section 16. In the example illustrated in FIG. 2, the line-of-sight detection section 20 is disposed at an end of the operation panel section 16. However, the line-of-sight detection section 20 may be disposed on the face of the operation panel section 16, or may be disposed in the operation panel section 16. Also, the line-of-sight detection section 20 may be disposed at a position away from the operation panel section 16 or may be provided with an illumination section that illuminates the user and the like.

In this regard, in the image forming apparatus 1, the control section 10 and the image processing section 11 may be formed integrally like a CPU with integrated GPU, a chip-on-module package, or the like.

Also, the control section 10 or the image processing section 11 may include a RAM, a ROM, a flash memory, or the like.

Also, the image forming apparatus 1 may include a FAX transmission/reception section that performs facsimile transmission and reception.

Figure 3:
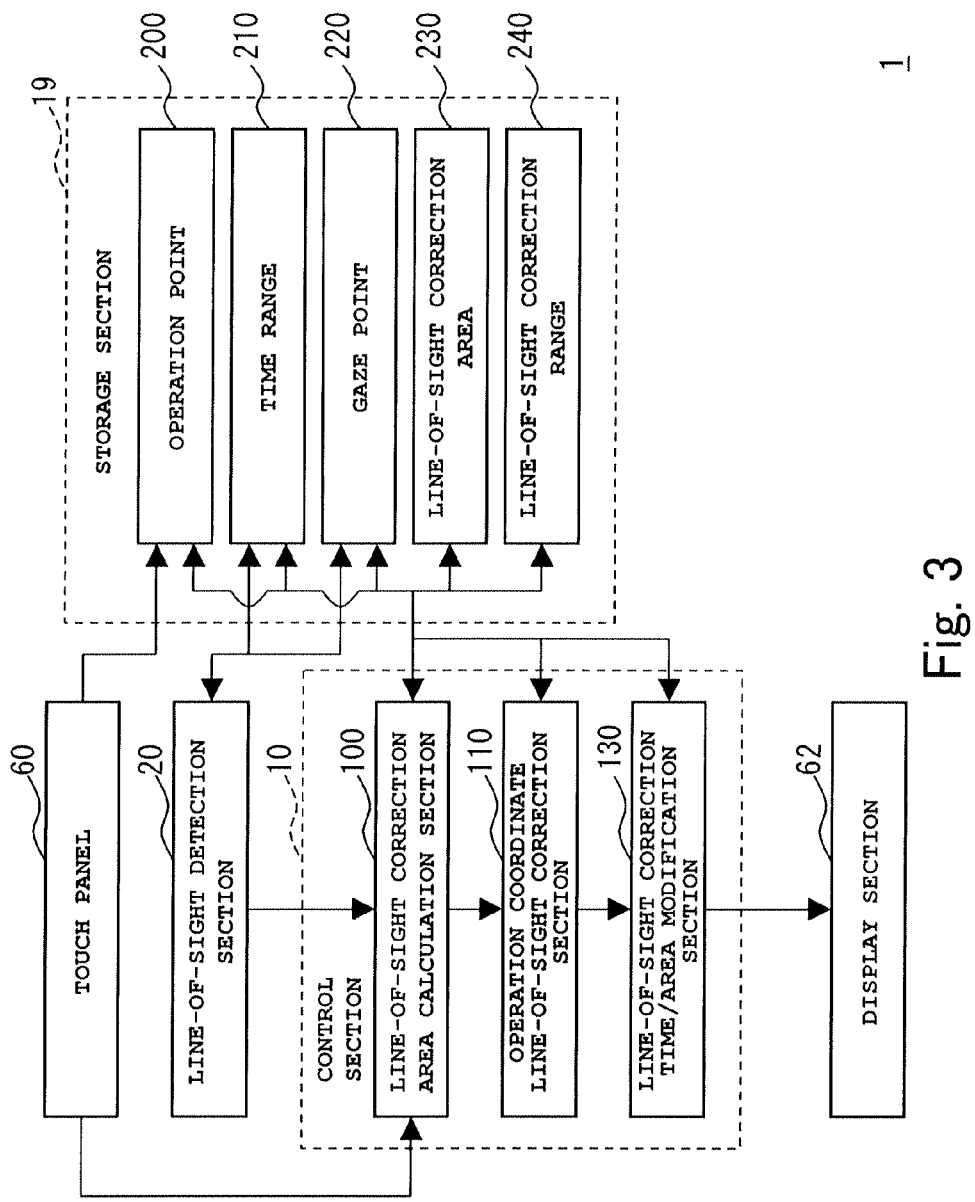
FIG. 3 illustrates a control configuration of the image forming apparatus illustrated in FIG. 1.

Next, a description will be given of the control configuration of the image forming apparatus 1 with reference to FIG. 3.

The control section 10 of the image forming apparatus 1 includes a line-of-sight correction area calculation section 100, an operation coordinate line-of-sight correction section 110, and a line-of-sight correction time/area modification section 130.

The storage section 19 stores an operation point 200, the time range 210, the gaze point 220, a line-of-sight correction area 230, and a line-of-sight correction range 240.

The line-of-sight correction area calculation section 100 calculates the coordinates of the line-of-sight correction area 230 from the coordinates of the gaze point 220 on the touch panel 60, which was calculated by the line-of-sight detection section 20, and the line-of-sight correction range 240, and stores the coordinates into the storage section 19. The line-of-sight correction area calculation section 100 calculates, for example, coordinates in the line-of-sight correction range 240 as the line-of-sight correction area 230 with the gaze point 220 as center coordinates.

The operation coordinate line-of-sight correction section 110 changes the coordinates of the operation point 200 based on the line-of-sight correction area 230 calculated by the line-of-sight correction area calculation section 100. If the operation point 200 is in the line-of-sight correction area 230, the operation coordinate line-of-sight correction section 110 changes the coordinates of the operation point 200 to the coordinates of the gaze point 220. Also, if the operation point 200 is not within the line-of-sight correction area 230, the operation coordinate line-of-sight correction section 110 does not change the coordinates of the operation point 200.

Also, the operation coordinates line-of-sight correction section 110 calls each processing of GUI after correcting these coordinates.

Also, after the operation coordinate line-of-sight correction section 110 changes the coordinates of the operation point 200, when a user corrects the display of a character by new touch input, the operation coordinate line-of-sight correction section 110 may perform processing so as not to change the coordinates of the operation point 200 of the new touch input corresponding to the correction of the display again.

The line-of-sight correction time/area modification section 130 modifies the time range 210, and the range set by the line-of-sight correction area 230. After the operation coordinate line-of-sight correction section 110 changes the coordinates of the operation point 200, the line-of-sight correction time/area modification section 130 detects correction of a display of the GUI input character by the user. If the line-of-sight correction time/area modification section 130 detects correction of the display, the line-of-sight correction time/area modification section 130 corrects this. The line-of-sight correction time/area modification section 130 changes the time range 210 from the set value at this time, or changes the extent or the shape of the line-of-sight correction area 230.

The operation point 200 is the data of the coordinates of the operation point of touch input by the user, which was detected by the touch panel 60. The operation point 200 may be provided with the setting of the display coordinates on the screen of the display section 62. Also, the operation point 200 may include the data on the order of pressing, or the touch order of multi-touch, the direction and acceleration of movement, and the like.

The time range 210 is data that specifies a range of a time (period) during which the line-of-sight detection section 20 calculates the coordinates of the gaze point 220. In the case of a software keyboard, it is possible to set a range of about a few μ seconds to a few seconds, which is a time period between a calculation start point in time and a calculation end point before and after a time point of the touch input on the touch panel 60 in the time range 210.

The gaze point 220 is data of the coordinates of the gaze point on the touch panel 60 to which a line of sight of a user is directed, which was calculated by the line-of-sight detection section 20. The coordinates allowed to be compared with the operation point 200, such as display coordinates on the screen of the display section 62, or the like, is set in the gaze point 220. Also, the gaze point 220 may include values, such as a time period during which individual gaze point coordinates are gazed, a movement vector of the gaze point coordinates, variance values of the gaze point coordinates, gaze probability, and the like.

The line-of-sight correction area 230 is data of the coordinates of the area into which the coordinates of the operation point 200 are changed by the operation coordinate line-of-sight correction section 110. The line-of-sight correction area 230 is calculated by the line-of-sight correction area calculation section 100 using the coordinates of the gaze point 220, and the line-of-sight correction range 240.

The line-of-sight correction range 240 is data, such as a coordinate group of a specific range for calculating the line-of-sight correction area 230, mathematical expressions, and the like, by the line-of-sight correction area calculation section 100. The initial values of the coordinate group and the like of the line-of-sight correction range 240 may be, for example, the values in the range having a distance including a few key areas adjacent to the gaze point 220 on the software keyboard. Also, the size and the extent of this range may be modified by the line-of-sight correction time/area modification section 130.

In this regard, the line-of-sight correction range 240 may be data for identifying a circle with the gaze point 220 as center, an ellipse, or any shape of the range. Also, in the case where the shape of this range is an ellipse, the range may be set based on the number of keys on the software keyboard horizontally and vertically in a major axis and a minor axis. Also, as the shape of this range, a shape of an area including a plurality of keys on the software keyboard may be specified.

Here, the control section 10 of the image forming apparatus 1 executes the control program stored in the storage section 19 so as to function as the line-of-sight correction area calculation section 100, the operation coordinate line-of-sight correction section 110, and the line-of-sight correction time/area modification section 130.

Also, each section in the above-described image forming apparatus 1 becomes a hardware resource for executing a method of forming an image according to the present disclosure.

Next, a description will be given of operation coordinate line-of-sight correction processing by the image forming apparatus 1 according to the embodiment of the present disclosure with reference to FIG. 4 and FIG. 5.

In the operation coordinate line-of-sight correction processing in the first embodiment, the line-of-sight correction range 240 having the gaze point 220 pointed by the line of sight as center is calculated as the line-of-sight correction area 230. After that, if the operation point 200 that was touch input is inside the line-of-sight correction area 230, it is assumed that the gaze point 220 is touched, and the coordinates of the operation point 200 are changed (hereinafter, in this manner, correcting the coordinates of the operation point 200 by a line of sight on a specific condition is referred to as "correct a line-of-sight"). If the operation point 200 is outside the line-of-sight correction area 230, the coordinates of the operation point 200 are not changed, and the operation place is determined to have been touched without change.

In the operation coordinate line-of-sight correction processing in the first embodiment, the control section 10 mainly executes the program stored in the storage section 19 in collaboration with each section using the hardware resource.

In the following, a description will be given of the details of the operation coordinate line-of-sight correction processing for each step with reference to a flowchart in FIG. 4.

Step S101

First, the control section 10 performs line of sight detection start processing as the line-of-sight correction area calculation section 100.

When the GUI displays a screen for acquiring a user's instruction from the touch panel 60, such as a software keyboard, or the like, the control section 10 starts line-of-sight detection by the line-of-sight detection section 20. Thereby, the line-of-sight detection section 20 starts line-of-sight detection, and starts calculating a gaze point 220.

Step S102

Next, the touch panel 60 performs operation point detection processing.

When the touch panel 60 detects touch input caused by a user pressing a finger, the touch panel 60 sets the coordinates on the operation point 200 that was touch input, and stores the coordinates into the storage section 19. Also, the touch panel 60 notifies a time point of this touch input to the line-of-sight detection section 20.

Step S103

Next, the line-of-sight detection section 20 performs gaze point calculation processing.

The line-of-sight detection section 20 calculates data of the gaze point coordinates on the touch panel 60 where a user's line of sight is directed in the time range 210 before and after a time point of the touch input. The line-of-sight detection section 20 calculates the coordinates of the gaze point 220 from the data of the calculated gaze point coordinates, and stores the data into the storage section 19. The line-of-sight detection section 20 notifies the control section 10 that the line-of-sight detection section 20 has calculated the coordinates of the gaze point 220.

Step S104

Next, the control section 10 performs line-of-sight correction area calculation processing by the line-of-sight correction area calculation section 100.

The control section 10 calculates a group of coordinates of the line-of-sight correction range 240, with the gaze point 220 as center, as the line-of-sight correction area 230 by the notification from the line-of-sight detection section 20.

Figure 5A:
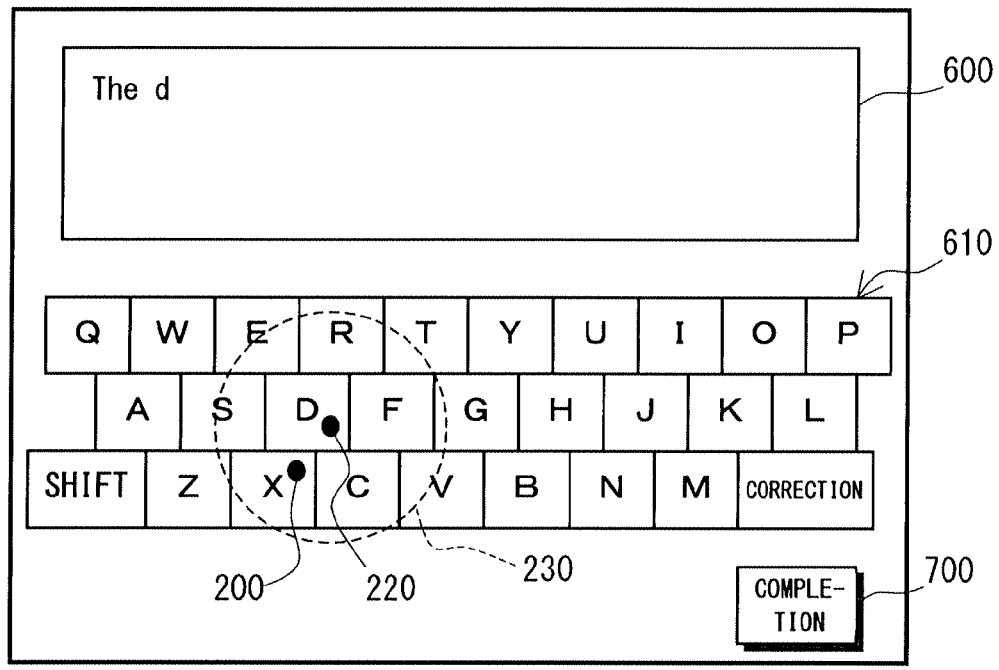
FIG. 5A and FIG. 5B illustrate a concept of the operation coordinate line-of-sight correction processing.
Figure 5B:
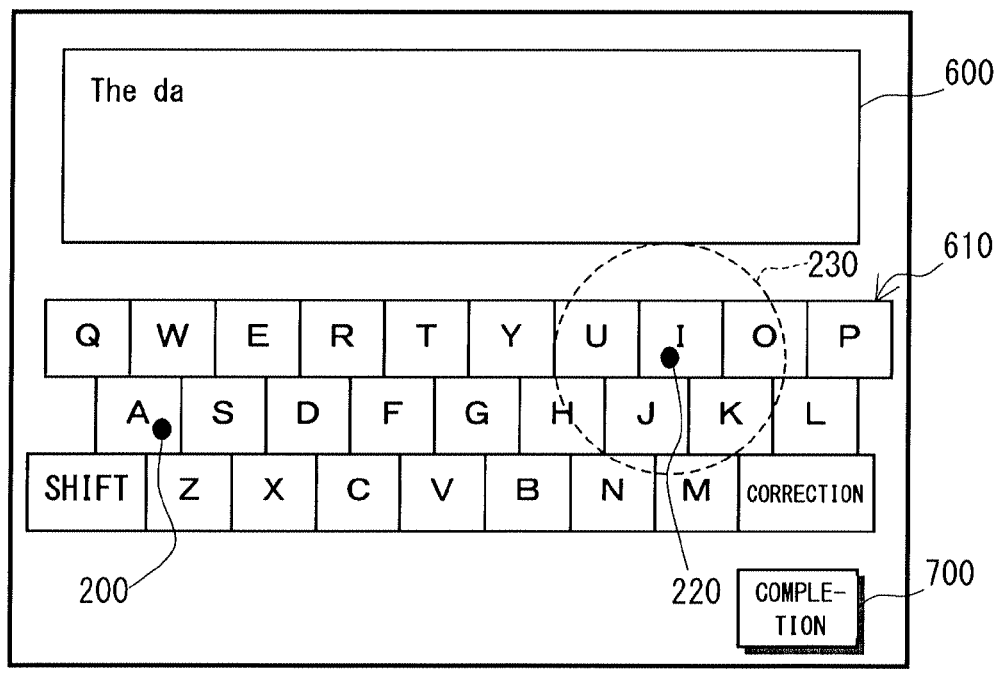

In a screen example 500 in FIG. 5A, and in a screen example 501 in FIG. 5B, examples are displayed in which a line-of-sight correction area 230 is displayed as a circle having a diameter including one to three key images on a software keyboard with the gaze point 220 as center. In FIG. 5A and FIG. 5B, a display field 600 that is an input field of characters, and a software keyboard 610 for inputting characters into the display field 600 are shown. Also, a button 700 indicates the completion of input.

Step S105

Next, the operation coordinate line-of-sight correction section 110 of the control section 10 determines whether the operation point 200 is positioned inside the line-of-sight correction area 230 or not. As shown in the screen example 500 in FIG. 5A, the control section 10 determines "Yes" if the operation point 200 is positioned inside the line-of-sight correction area 230. On the contrary, the control section 10 determines "No" if the operation point 200 is positioned outside the line-of-sight correction area 230, as shown in the screen example 501 in FIG. 5B. In this regard, the control section 10 may determine "No", even when the operation point 200 is positioned inside the correction area, if a value, such as a gaze probability, or the like, is equal to or less than a threshold value.

If the determination is "Yes", the control section 10 causes the processing to proceed to step S106.

If the determination is "No", the control section 10 causes the processing to proceed to step S107.

Step S106

If the operation point 200 is positioned inside the line-of-sight correction area 230, the operation coordinate line-of-sight correction section 110 of the control section 10 performs operation point coordinate change processing.

The control section 10 changes the coordinates of the operation point to the coordinates of the gaze point 220. At this time, the control section 10 may not only change the coordinates of the operation point to the coordinates of the gaze point 220, but may change the coordinates to specific coordinates. The specific coordinates may be a center of a key on the software keyboard that includes the gaze point 220, or the like, for example.

Step S107

Here, the operation coordinate line-of-sight correction section 110 of the control section 10 performs operation point instruction operation execution processing.

The control section 10 notifies the GUI that processing corresponding to the user's touch input is to be executed on the coordinates of the operation point 200. (If the operation point coordinate change processing in step S106 has been performed, the operation point 200 has been changed to the gaze point 220. If the operation point coordinate change processing in step S106 has not been performed, then the operation point 200 used is that which was touch inputted). For example, if the GUI is a software keyboard, the control section 10 inputs characters and the like corresponding to the key at the notified place of the operation point 200 through the GUI, and displays the characters in the input field of the display section 62 or the like.

Step S108

Next, the line-of-sight correction time/area modification section 130 of the control section 10 determines whether or not there has been a user correction. The control section 10 determines "Yes" if there has been a correction by a user during the character input in step S107. Specifically, in the case of a software keyboard, if the user has pressed a "correction" key during the character input or the like, and has touch inputted the other characters, the control section 10 determines "Yes". Otherwise, for example, if the user has input the other characters without correction, or has pressed the completion button 700, the control section 10 determines "No".

If the determination is "Yes", the control section 10 causes the processing to proceed to step S109.

If the determination is "No", the control section 10 terminates the operation coordinate line-of-sight correction processing.

Step S109

In the above-described step S108, if there has been a correction by the user, the line-of-sight correction time/area modification section 130 of the control section 10 performs the operation point coordinate change suppression processing.

The above-described touch input of the other characters is performed based on a key corresponding to the coordinates of the operation point of the touch input at the time of user correction.

At this time, the operation coordinate line-of-sight correction section 110 of the control section 10 performs control with respect to the operation point of touch input of the other characters so as not to perform the operation point coordinate change processing. That is to say, the control section 10 does not change the coordinates of the operation point 200 of touch input corresponding to the display correction again.

In this regard, depending on the setting stored in the storage section 19, the control section may make the range of the change of the coordinates of the operation point 200 smaller, or may not allow the change at all at the time of this processing.

Step S110

Next, the line-of-sight correction time/area modification section 130 of the control section 10 performs line-of-sight correction time/area modification processing.

For example, in the case of a software keyboard, it is possible for the control section 10 to change the time range 210 from the set value.

Also, for example, if the coordinates of the operation point 200 before the change fall on the coordinates of the corrected key, the control section 10 makes a modification to narrow the line-of-sight correction range 240 so that the coordinates of the operation point 200 before the change are not included in the line-of-sight correction range 240. Also, on the contrary, if the coordinates of the gaze point 220 fall on the coordinates of the corrected key, the control section 10 makes a modification to widen the line-of-sight correction range 240 so that the coordinates of the operation point 200 are included in the line-of-sight correction range 240.

By the above, the operation coordinate line-of-sight correction processing according to the embodiment of the present disclosure is terminated.

Second Embodiment

Figure 2:
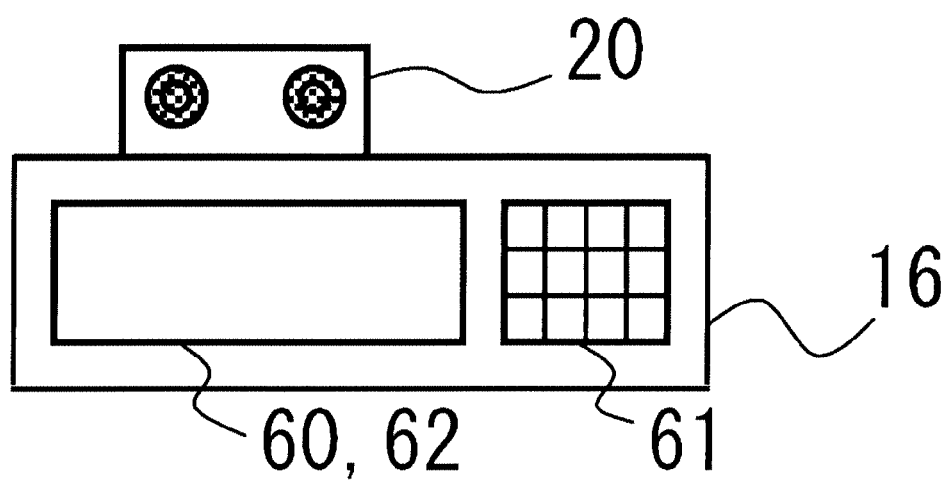
FIG. 2 illustrates an example of an outer view of an operation panel section and a line-of-sight detection section according to a first embodiment of the present disclosure.

An electronic device according to a second embodiment has the same overall configuration as that of the image forming apparatus 1 according to the first embodiment illustrated in FIG. 1 and FIG. 2.

Figure 6:
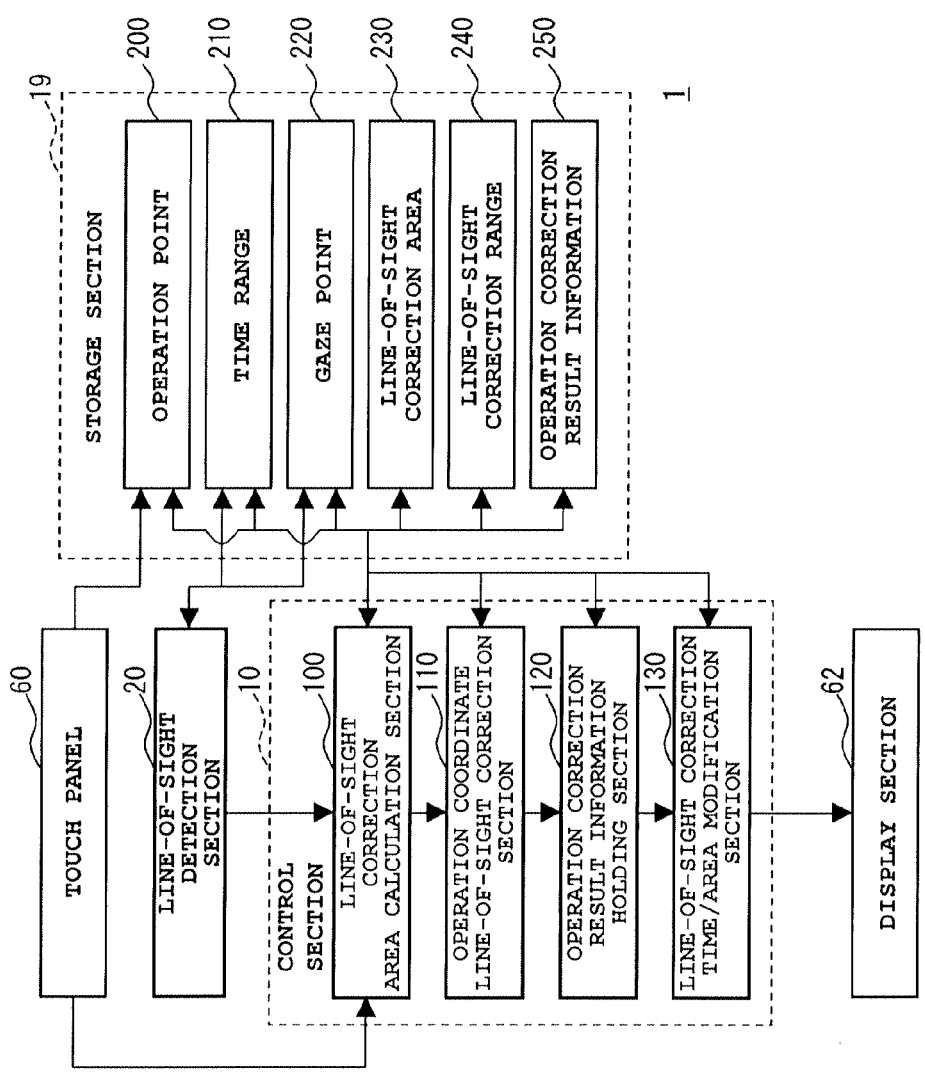
FIG. 6 is a block diagram illustrating a control configuration of an image forming apparatus according to a second embodiment of the present disclosure.

A description will be given of the control configuration of the image forming apparatus 1 with reference to FIG. 6.

The control section 10 of the image forming apparatus 1 includes a line-of-sight correction area calculation section 100, an operation coordinate line-of-sight correction section 110, an operation correction result information holding section 120, and a line-of-sight correction time/area modification section 130.

The storage section 19 stores the operation point 200, the time range 210, the gaze point 220, the line-of-sight correction area 230, the line-of-sight correction range 240, and operation correction result information 250.

The line-of-sight correction area calculation section 100 calculates the coordinates of the line-of-sight correction area 230 from the coordinates of the gaze point 220 calculated by the line-of-sight detection section 20 on the touch panel 60, and the line-of-sight correction range 240, and stores the coordinates into the storage section 19. The line-of-sight correction area calculation section 100 calculates, for example, the coordinates in the line-of-sight correction range 240 with the gaze point 220 as center coordinates of the line-of-sight correction area 230. At this time, the line-of-sight correction area calculation section 100 refers to the specific coordinate change values included in the line-of-sight correction range 240, and calculates the line-of-sight correction area 230.

The operation coordinate line-of-sight correction section 110 is the same as the operation coordinate line-of-sight correction section 110 in the first embodiment.

The operation correction result information holding section 120 stores the coordinates of the operation point 200, the coordinates of the gaze point 220, and the change result of the coordinates of the operation point 200 by the operation coordinate line-of-sight correction section 110 into the storage section 19 as the operation correction result information 250, and holds the information.

Also, the operation correction result information holding section 120 may also hold the user's operation history of correction of a display, such as of characters and the like, as the operation correction result information 250.

The line-of-sight correction time/area modification section 130 modifies the ranges of the time range 210, and the line-of-sight correction area 230. The line-of-sight correction time/area modification section 130 detects the correction of a display, such as characters and the like, of the GUI input by the user after the change of the coordinate of the operation point 200 by the operation coordinate line-of-sight correction section 110. When the line-of-sight correction time/area modification section 130 detects the display correction, the line-of-sight correction time/area modification section 130 displays the correction, that is, the corrected character, on the display section 62. At this time, the line-of-sight correction time/area modification section 130 changes the time range 210 from the set value, or changes the width or the shape of the line-of-sight correction area 230.

Also, if the user's correction matches the display of the gaze point 220, the line-of-sight correction time/area modification section 130 expands the line-of-sight correction area 230. If the user's correction matches the display of the operation point 200, the line-of-sight correction time/area modification section 130 contracts the line-of-sight correction area 230. If the user's correction matches neither the display of the gaze point 220 nor the display of the operation point 200, the line-of-sight correction time/area modification section 130 refers to the operation correction result information 250 and moves the line-of-sight correction range 240.

The operation point 200, the time range 110, the gaze point 220, the line-of-sight correction area 230, and the line-of-sight correction range 240 are defined in the same manner as the first embodiment.

However, when the line-of-sight correction area calculation section 100 calculates the line-of-sight correction area 230 from the gaze point 220 calculated by the line-of-sight detection section 20, the line-of-sight correction range 240 may include a specific coordinate change value to be used for changing the coordinates and the like as an offset value or the like.

The operation correction result information 250 is data on the change result history and the like of the coordinates of the operation point 200, the coordinates of the gaze point 220, and the coordinates of the operation point 200 by the operation coordinate line-of-sight correction section 110. The operation correction result information 250 is held for a specific retention period or a retention quantity in order to automatically change the line-of-sight correction area 230. It is possible to set a specific time period, for example, about a few seconds to a few minutes, for this specific retention period. Also, for a specific retention quantity, for example, in the case of a software keyboard, it is possible to set the amount of input data to a specific number of characters, such as one character to tens of characters. In this regard, a necessary amount of operation correction result information 250 may be retained correspondingly to the storage capacity of the storage section 19. Also, the operation correction result information 250 may include information related to the operation history of user's display correction and the like.

Here, the control section 10 of the image forming apparatus 1 executes the operation support program included in the control program stored in the storage section 19 so as to function as the line-of-sight correction area calculation section 100, the operation coordinate line-of-sight correction section 110, the operation correction result information holding section 120, and the line-of-sight correction time/area modification section 130.

Also, each section in the above-described image forming apparatus 1 becomes a hardware resource for executing a method of forming an image according to the present disclosure.

Figure 7:
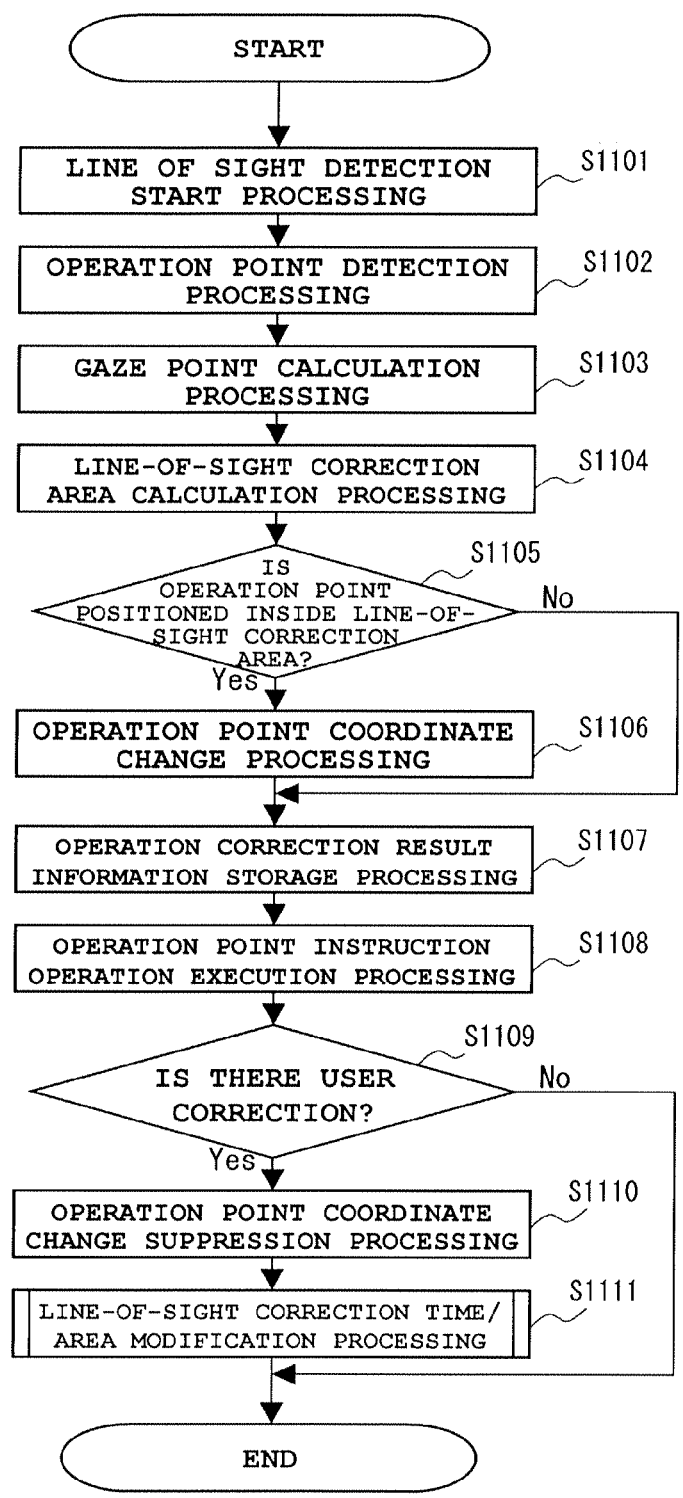
FIG. 7 illustrates steps of operation coordinate line-of-sight correction processing according to the second embodiment of the present disclosure.
Figure 8:
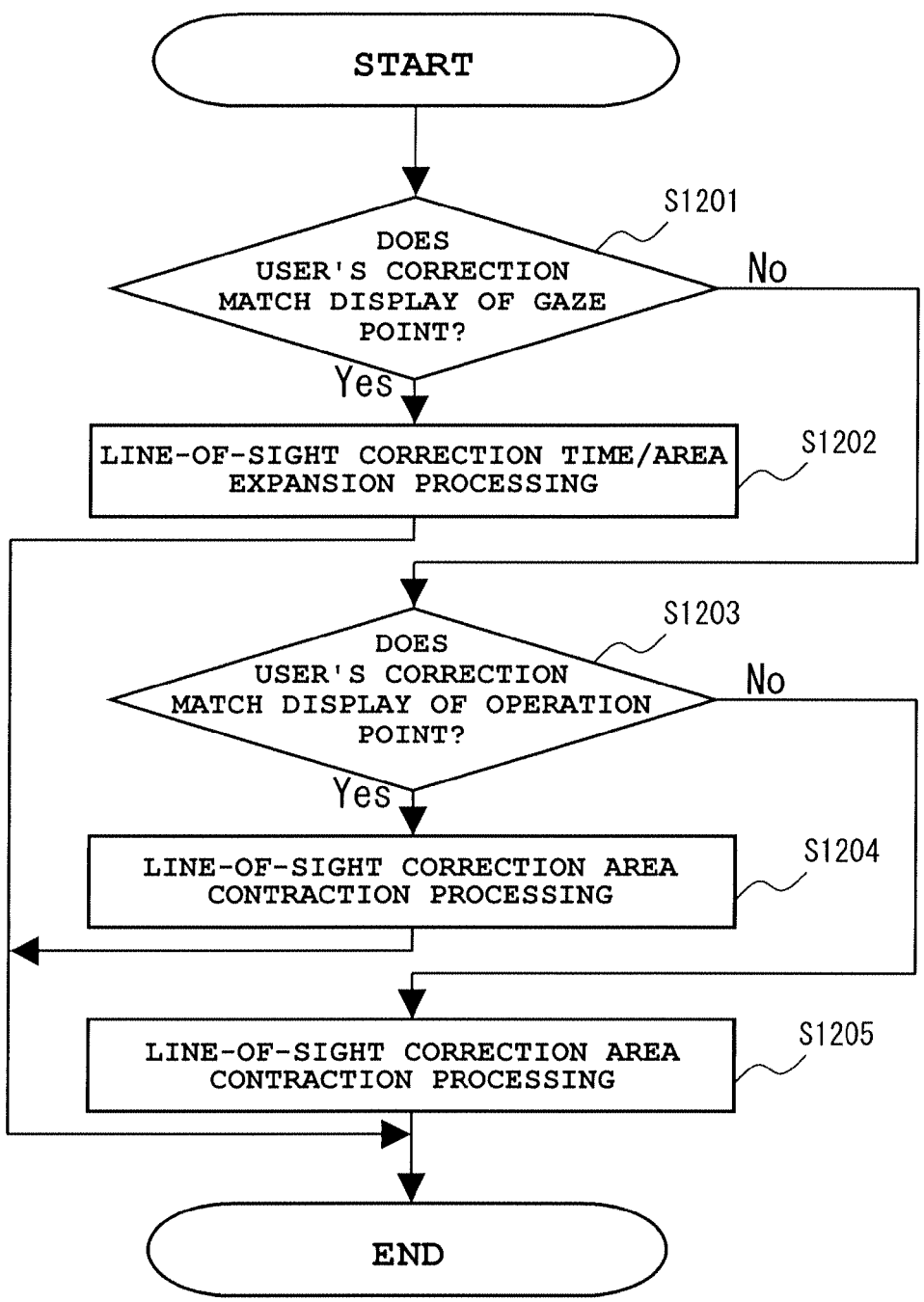
FIG. 8 illustrates steps of the line-of-sight correction time/area modification processing illustrated in FIG. 7.

Next, a description will be given of the operation coordinate line-of-sight correction processing by the image forming apparatus 1 according to the embodiment of the present disclosure with reference to FIG. 7 and FIG. 8.

In the operation coordinate line-of-sight correction processing in the second embodiment, the line-of-sight correction range 240 having the gaze point 220 pointed by the line of sight as center is calculated as the line-of-sight correction area 230. After that, if the operation point 200 that was touch input is inside the line-of-sight correction area 230, then it is assumed that the gaze point 220 is touched, and the coordinates of the operation point 200 are changed. (Hereinafter, correcting the coordinates of the operation point 200 by a line of sight on a specific condition is referred to as "correct a line-of-sight.") If the operation point 200 is outside the line-of-sight correction area 230, then the coordinates of the operation point 200 are not changed, and the operation place is determined to be touched without change.

In the operation coordinate line-of-sight correction processing in the second embodiment, the control section 10 mainly executes the program stored in the storage section 19 in collaboration with each section using the hardware resource.

In the following, a description will be given of the details of the operation coordinate line-of-sight correction processing for each step with reference to a flowchart in FIG. 7.

Steps S1101 to S1106

Figure 4:
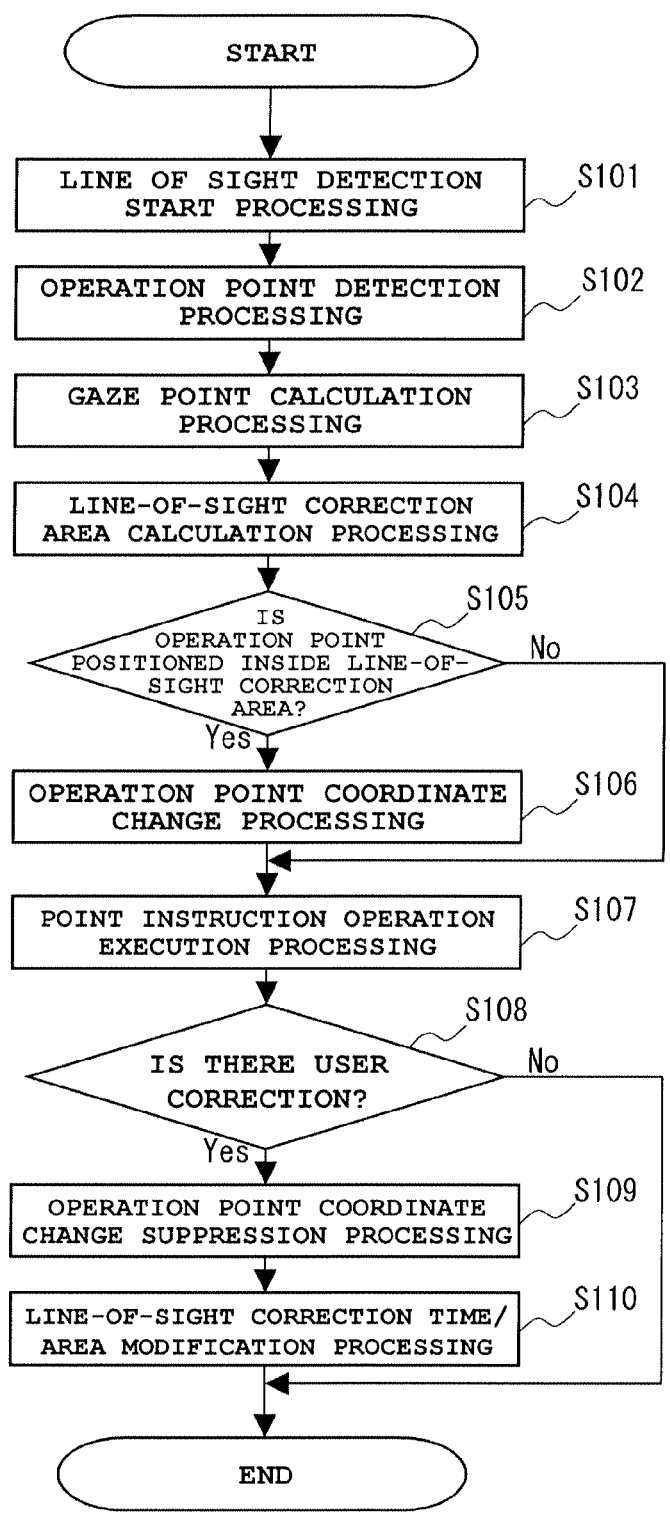
FIG. 4 illustrates steps of operation coordinate line-of-sight correction processing according to the first embodiment of the present disclosure.

The processing in steps S1101 to S1106 is the same as the processing in steps S101 to S106 illustrated in FIG. 4, respectively.

Step S1107

Here, the operation correction result information holding section 120 of the control section 10 performs operation correction result information storage processing.

For example, in the case where a software keyboard is displayed in the display section 62, the control section 10 stores the operation correction result information 250 in the storage section 19 for one character input and for each operation point coordinate change processing. The operation correction result information 250 may include the coordinates of the operation point 200, the coordinates of the gaze point 220, and the change result of the coordinates of the operation point 200.

Step S1108

Next, the operation coordinate line-of-sight correction section 110 of the control section 10 performs operation point instruction operation execution processing.

The control section 10 notifies the GUI to execute the processing corresponding to the user's touch input on the coordinates of the operation point 200. (If the operation point coordinate change processing in step S1106 has been performed, then the operation point 200 has been changed to the gaze point 220. If the operation point coordinate change processing in step S1106 has not been performed, then the operation point 200 used is that which was touch inputted). For example, in the case where the GUI is a software keyboard, the control section 10 inputs the characters or the like corresponding to the key of the place of the notified operation point 200 by the GUI, and displays the characters or the like in the input field or the like of the display section 62.

Step S1109

Next, the line-of-sight correction time/area modification section 130 of the control section 10 determines whether there has been a user correction. The control section 10 determines "Yes" if there has been a correction by the user on the characters and the like that were input in step S1108 and displayed. Specifically, in the case of a software keyboard, if the user has pressed a "correction" key during the input of characters and the like, and has touch input the other characters, that means there has been a correction and thus the control section 10 determines "Yes". Otherwise, for example, if the user has input the other characters without correction or has pressed the completion button 700, the control section 10 determines "No".

If the determination is "Yes", then the control section 10 causes the processing to proceed to step S1110.

If the determination is "No", then the control section 10 terminates the operation coordinate line-of-sight correction processing.

Step S1110

If there has been a correction by a user, the line-of-sight correction time/area modification section 130 of the control section 10 performs the operation point coordinate change suppression processing in the above-described step S1109.

The above-described touch input of the other characters is performed based on the key corresponding to the coordinates of the operation point of the touch input at the time of user correction.

At this time, the control section 10 controls the operation coordinate line-of-sight correction section 110 not to perform operation point coordinate change processing on the operation point of the touch input of the other characters.

That is to say, the control section 10 does not change the coordinates of the operation point 200 of the touch input corresponding to the display correction again.

In this regard, at the time of this processing, depending on the setting stored in the storage section 19, the control section 10 may make the range of the change in the coordinates of the operation point 200 smaller or may not change the range at all.

Also, the operation correction result information holding section 120 of the control section 10 may also store the result of the correction into the storage section 19 by including the result of the correction in the operation correction result information 250.

Step S1111

Next, the line-of-sight correction time/area modification section 130 of the control section 10 performs line-of-sight correction time/area modification processing.

A description will be given of the details of the line-of-sight correction time/area modification processing in the following.

By the above, the operation coordinate line-of-sight correction processing according to the embodiment of the present disclosure is terminated.

In the following, a description will be given of the details of the line-of-sight correction time/area modification processing for each step with reference to a flowchart in FIG. 8, and FIG. 9A to FIG. 11B.

Step S1201

First, the control section 10 determines whether or not the user's correction matches the display of the gaze point 220.

The control section 10 refers to the operation correction result information 250 on the display correction of the character and the like, which were input in step S1108. If the corrected display matches the display of the gaze point 220, the control section 10 determines "Yes". In the example in FIG. 9A, the character "D" of the corrected display 260 matches the character pointed by the gaze point 220, and thus the control section 10 determines "Yes". In the other cases, if the corrected display does not match the display pointed by the gaze point 220, the control section 10 determines "No".

If the determination is "Yes", then the control section 10 causes the processing to proceed to step S1202.

If the determination is "No", then the control section 10 causes the processing to proceed to step S1203.

Step S1202

If the correction matches the display of the gaze point 220, the control section 10 performs line-of-sight correction area expansion processing.

According to the example in FIG. 9B, the control section 10 expands the line-of-sight correction range 240 to perform modification so that the operation point 200 is included in the line-of-sight correction area 230. When coordinates such as the operation point 200 are input on the touch panel 60, for example, if the user directs the line of sight to the coordinates of the gaze point 220, the coordinates are included in the line-of-sight correction area 230 calculated from the line-of-sight correction range 240. Thus, it becomes possible to perform correction of the line of sight and to reduce user's input errors.

After that, the control section 10 terminates the line-of-sight correction time/area modification processing.

Step S1203

If the correction does not match the display of the gaze point 220, the control section 10 determines whether or not the user's correction matches the display of the operation point 200.

The control section 10 refers to the operation correction result information 250, and if the corrected display matches the display of the operation point 200, the control section 10 determines "Yes". By the example in FIG. 10A, the character "X" of the corrected display 260 matches the character pointed by the operation point 200, and thus the control section 10 determines "Yes". Otherwise, if the corrected display does not match the display pointed by the operation point 200, the control section 10 determines "No".

If the determination is "Yes", the control section 10 causes the processing to proceed to step S1204.

If the determination is "No", the control section 10 causes the processing to proceed to step S1205.

Step S1204

If the correction matches the display of the operation point 200, the control section 10 performs line-of-sight correction area contraction processing.

Figure 10A:
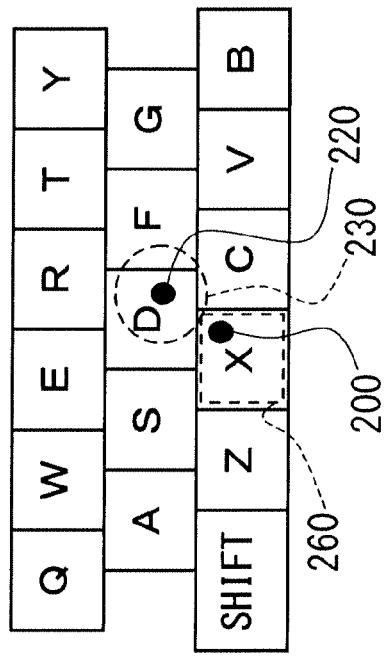
FIG. 10A and FIG. 10B illustrate a concept of the line-of-sight correction area contraction processing illustrated in FIG. 8.
Figure 10B:
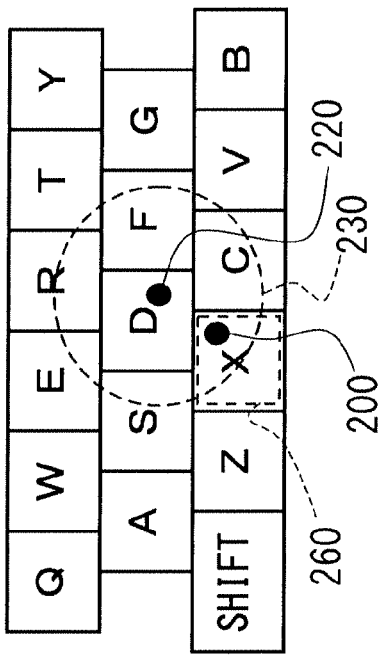

By the example in FIG. 10B, the control section 10 contracts the line-of-sight correction range 240 to perform modification so that the operation point 200 is not included in the line-of-sight correction area 230. Thereby, after that, even when coordinates, such as the operation point 200, are input on the touch panel 60, for example, if the user directs the line of sight to the coordinates of the gaze point 220, the coordinates outside the line-of-sight correction area 230 are calculated by the line-of-sight correction range 240, and thus the line-of-sight correction is not performed. Accordingly, it is possible to prevent miscorrection by the line of sight correction, and to improve user's usability.

After that, the control section 10 terminates the line-of-sight correction time/area modification processing.

Step S1205

Here, if the correction does not match the display of the operation point 200 (i.e., if the correction matches neither the gaze point 220 nor the operation point 200), the control section 10 performs line-of-sight correction area movement processing. In the line-of-sight correction area movement processing, the control section 10 refers to the history of the operation correction result information 250, and moves the coordinates of the line-of-sight correction range 240 or the like.

Figure 11B:
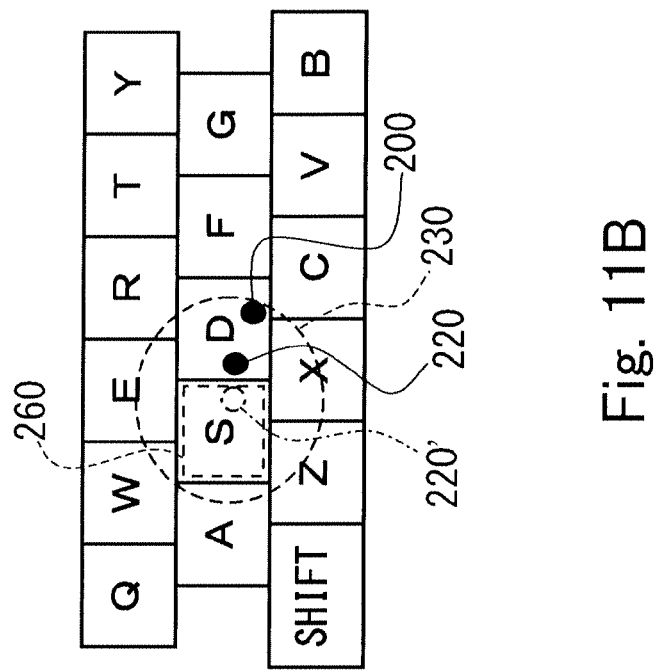
FIG. 11A and FIG. 11B illustrate a concept of the line-of-sight correction area movement processing illustrated in FIG. 8.
Figure 11A:
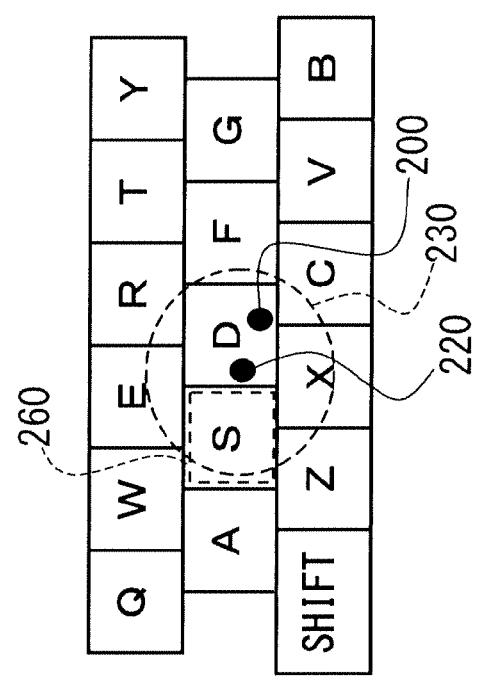

FIG. 11A illustrates an example in which, although the character pointed by the operation point 200 matches the character pointed by the gaze point 220 and thus the line-of-sight correction has not been performed, a user corrected the character of the display 260 to "S". In this example, the control section 10 made a change so as to move the coordinate change value included in the line-of-sight correction range 240 to the left by specific coordinates.

FIG. 11B illustrates an example in which after the line-of-sight correction range 240 is changed, the coordinates as the operation point 200 are input on the touch panel 60, and the line-of-sight detection section 20 has detected the coordinates of the gaze point 220. In this example, the control section 10 applies a coordinate change value to the gaze point 220 to calculate the coordinates of a gaze point 220', and calculates the line-of-sight correction area 230 corresponding to the coordinates of the gaze point 220'. Thereby, the line-of-sight correction as intended by the user is performed and the character "S" is input.

Here, the control section 10 may refer to the history of the display correction of a plurality of characters, or the like, of the operation correction result information 250, and calculates the average value or the median of the differences between the corrected display and the gaze point 220. The control section may set this average value or median as the coordinate change value of the line-of-sight correction range 240. In this regard, the control section 10 may set the average value, the median, or the like, of the calculated differences directly to the coordinate change value, or may set an increase or a decrease by a specific value in the shifted direction. Also, the control section 10 may not set specific coordinate change values, but may change the shape and the range of the line-of-sight correction range 240 directly.

Also, it is possible for the control section 10 to change the time range 210 from the set value. For example, in the case where the display is a software keyboard, the control section 10 may calculate a suitable time range 210 so as to calculate the line-of-sight correction area 230 including the coordinates corresponding to the display correction of the character and the like from history of the correction of operation correction result information 250.

By the above, the line-of-sight correction time/area modification processing according to the second embodiment is terminated.

In this regard, a description has been given that the control section 10 makes a change immediately when the control section 10 changes the line-of-sight correction range 240 by the line-of-sight correction time/area modification processing in the second embodiment. However, the control section 10 may not change the range immediately, but may change when a specific threshold value is exceeded. For this specific threshold value, the control section 10 may make a change when the user has performed correction for a specific number of times that is greater than a few times, for example.

Also, the control section 10 does not have to immediately change the line-of-sight correction range 240 on the screen in operation as the timing to change the line-of-sight correction range 240. That is to say, the control section 10 may change the line-of-sight correction range 240 correspondingly to various conditions, such as at the time of entering a power saving state, at the time the power is turned off, at the date and time specified by a timer, or the like, for example.

With the image forming apparatus 1 according to the embodiment of the present disclosure, it becomes possible to perform touch input with the prevention of operation errors without the display contents being expanded, the number of display characters being changed, or the like. Thereby, information that is allowed to be displayed is not reduced, and it is possible to improve the user's usability.

In the image forming apparatus 1 according to the embodiment of the present disclosure, at the time of line-of-sight correction, the contents displayed on the display section 62 are not expanded, and thus the user is not confused. Thereby, it is possible to improve operation of the apparatus.

Also, in the image forming apparatus 1 according to the embodiment of the present disclosure, when a correction by a user is detected, the time range 210 and the line-of-sight correction range 240 are modified so that it is possible to improve precision of the user's line-of-sight correction. Thereby, it becomes possible for the user to instruct a key at the place intended by the user or the like, and thus it is possible to improve operation of the apparatus.

In particular, the operation correction result information 250 is held, and is referenced at the time of modification of the line-of-sight correction range 240 so that it becomes possible to handle the case, even if the user's input display is not immediately corrected. For example, in the case of a software keyboard, even if the display of the characters or the like that were input a few characters ahead is corrected, it is possible to modify the line-of-sight correction range 240.

In the image forming apparatus 1 according to the embodiment of the present disclosure, it is possible to adjust the line-of-sight correction range 240 to meet the user's correction and improve the precision of the line-of-sight correction.

In the image forming apparatus 1 according to the embodiment of the present disclosure, at the time of display correction of the input character or the like, it is possible to prevent input display from being changed unintentionally and thus to improve the user's operationality.

Also, in the embodiment of the present disclosure, a description has been given of an example in which line-of-sight correction is performed on touch input of a key on a software keyboard. However, it is possible to apply the operation coordinate line-of-sight correction processing in the embodiment of the present disclosure to all the processing for selecting the display of an image or the like on the GUI on the touch panel 60 by touch input in addition to a software keyboard. That is to say, it is possible for the control section 10 to perform control so as to apply the operation coordinate line-of-sight correction processing of the embodiment of the present disclosure to the case where images, characters, or the like to be selected are positioned closely one another, such as, for example, selection of a preview image, or a thumbnail image, or selection of a file. Also, it is possible for the control section 10 to control and not to apply the operation coordinate line-of-sight correction processing of the embodiment of the present disclosure to a GUI having few operation errors on a screen.

Also, in the embodiment of the present disclosure, a description has been given of input on the touch panel 60 that is integrated with the screen of the display section 62. However, the display section 62 and the touch panel 60 may be configured as separate from one another. In this case, it is also possible for the line-of-sight detection section 20 to detect a user's line of sight on the separated touch panel 60.

It is possible to apply the present disclosure to various electronic devices in addition to an image forming apparatus. For example, it is possible to apply the present disclosure to an information processing apparatus provided with the touch panel 60 and the line-of-sight detection section 20, such as a smart phone, a mobile phone, a PC (Personal Computer), and a PDA (Personal Data Assistant), and the like. Also, it is possible to apply the present disclosure to home electric appliances provided with the touch panel 60 and the line-of-sight detection section 20, such as a television set, a microwave oven, a home robot, a home security system, and the like. Further, it is possible to apply the present disclosure to a vehicle control system, such as an electric motorcycle, an automobile, an aircraft, a ship and a vessel, and the like. In addition to these, it is possible to load the present disclosure in a form of a circuit board provided with the touch panel 60 and the line-of-sight detection section 20 on various devices as a part of the devices.

Also, the configuration and the operation of the above-described embodiments are only examples. It is possible to make various changes for implementation without departing from the spirit and scope of the present disclosure.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An electronic device comprising:
a touch panel that detects coordinates of an operation point of touch input by a user;
a line-of-sight detection section that calculates coordinates of a gaze point on the touch panel at which a line of sight of the user is directed during a specific time range from a time point of the touch input on the touch panel by the user;
a line-of-sight correction area calculation section that calculates a line-of-sight correction area in a specific range from the coordinates of the gaze point, calculated by the line-of-sight detection section, on the touch panel;
an operation coordinate line-of-sight correction section that changes the coordinates of the operation point to the coordinates of the gaze point if the coordinates of the operation point are within the line-of-sight correction area calculated by the line-of-sight correction area calculation section, and does not change the coordinates of the operation point if the coordinates of the operation point are not within the line-of-sight correction area;
a display section that is capable of displaying the coordinates of the operation point changed or unchanged by the operation coordinate line-of-sight correction section; and
a line-of-sight correction time/area modification section that modifies the time range and a range of the line-of-sight correction area if the user corrects the display after the operation coordinate line-of-sight correction section changes the coordinates of the operation point.

2. The electronic device according to claim 1, wherein, when the user corrects the display after the operation coordinate line-of-sight correction section changes the coordinates of the operation point, the operation coordinate line-of-sight correction section does not change the coordinates of the operation point of the touch input corresponding to the correction of the display.

3. An electronic device according to claim 1, further comprising:
a touch panel that detects coordinates of an operation point of touch input by a user;
a line-of-sight detection section that calculates coordinates of a gaze point on the touch panel at which a line of sight of the user is directed during a specific time range from a time point of the touch input on the touch panel by the user;
a line-of-sight correction area calculation section that calculates a line-of-sight correction area in a specific range from the coordinates of the gaze point, calculated by the line-of-sight detection section, on the touch panel;
an operation coordinate line-of-sight correction section that changes the coordinates of the operation point to the coordinates of the gaze point if the coordinates of the operation point are within the line-of-sight correction area calculated by the line-of-sight correction area calculation section, and does not change the coordinates of the operation point if the coordinates of the operation point are not within the line-of-sight correction area;

an operation correction result information holding section that holds the coordinates of the operation point, the coordinates of the gaze point, and a result of changing the coordinates of the operation point by the operation coordinate line-of-sight correction section as operation correction result information;

a display section that is capable of displaying the coordinates of the operation point changed or unchanged by the operation coordinate line-of-sight correction section; and a line-of-sight correction time/area modification section that refers to the operation correction result information held by the operation correction result information holding section, and that modifies the time range and a line-of-sight correction range if correction of the display on the display section by the user is detected after changing the coordinates of the operation point by the operation coordinate line-of-sight correction section, wherein the line-of-sight correction area calculation section calculates the line-of-sight correction area corresponding to the line-of-sight correction range from the coordinates of the gaze point on the touch panel, calculated by the line-of-sight detection section.

4. The electronic device according to claim 3, wherein if correction by the user matches the display of the gaze point, the line-of-sight correction time/area modification section expands the line-of-sight correction range;

wherein if correction by the user matches the display of the operation point, the line-of-sight correction time/area modification section contracts the line-of-sight correction range; and wherein if correction by the user matches neither the display of the gaze point nor the display of the operation point, the line-of-sight correction time/area modification section moves the line-of-sight correction range by the operation correction result information.

5. The electronic device according to claim 3, wherein when the user corrects the display after the coordinates of the operation point are changed, the operation coordinate line-of-sight correction section does not change the coordinates of the operation point of the touch input corresponding to correction of the display.

6. A method of supporting operation, the method comprising:

detecting, via a touch panel, coordinates of an operation point of touch input by a user;

calculating, via a line-of-sight detection section, coordinates of a gaze point on the touch panel at which a line of sight of the user is directed during a specific time range from a time point of the touch input on the touch panel by the user;

calculating, via a line-of-sight correction area calculation section, a line-of-sight correction area in a specific range from the coordinates of the gaze point, calculated by the line-of-sight detection section, on the touch panel;

changing, via an operation coordinate line-of-sight correction section, the coordinates of the operation point to the coordinates of the gaze point if the coordinates of the operation point are within the line-of-sight correction area calculated by the line-of-sight correction area calculation section, and not changing the coordinates of the operation point if the coordinates of the operation point are not within the line-of-sight correction area;

displaying, via a display section, the corresponding coordinates of the operation point changed or unchanged by the operation coordinate line-of-sight correction section; and modifying, via a line-of-sight correction time/area modification section, the time range and a range of the line-of-sight correction area if the user corrects the display after the operation coordinate line-of-sight correction section changes the coordinates of the operation point.

7. The method of supporting operation according to claim 6, further comprising:

not changing, via the operation coordinate line-of-sight correction section, the coordinates of the operation point of the touch input corresponding to the correction of the display when the user corrects the display after the operation coordinate line-of-sight correction section changes the coordinates of the operation point.

8. A method of supporting operation comprising:

detecting, via a touch panel, coordinates of an operation point of touch input by a user;

calculating, via a line-of-sight detection section, coordinates of a gaze point on the touch panel at which a line of sight of the user is directed during a specific time range from a time point of the touch input on the touch panel by the user;

calculating, via a line-of-sight correction area calculation section, a line-of-sight correction area in a specific range from the coordinates of the gaze point, calculated by the line-of-sight detection section, on the touch panel;

changing, via an operation coordinate line-of-sight correction section, the coordinates of the operation point to the coordinates of the gaze point if the coordinates of the operation point are within the line-of-sight correction area calculated by the line-of-sight correction area calculation section, and not changing the coordinates of the operation point if the coordinates of the operation point are not within the line-of-sight correction area;

holding, via an operation correction result information holding section, the coordinates of the operation point, the coordinates of the gaze point, and a result of changing the coordinates of the operation point by the operation coordinate line-of-sight correction section as operation correction result information;

displaying, via a display section, the coordinates of the operation point changed or unchanged by the operation coordinate line-of-sight correction section;

referring, via a line-of-sight correction time/area modification section, to the operation correction result information held by the operation correction result information holding section and modifying the time range and a line-of-sight correction range if correction of the display on the display section by the user is detected after changing the coordinates of the operation point by the operation coordinate line-of-sight correction section; and calculating, via the line-of-sight correction area calculation section, the line-of-sight correction area corresponding to the line-of-sight correction range from the coordinates of the gaze point on the touch panel, calculated by the line-of-sight detection section.

9. The method of supporting operation according to claim 8, further comprising:

via the line-of-sight correction time/area modification section, expanding the line-of-sight correction range if correction by the user matches the display of the gaze point, contracting the line-of-sight correction range if correction by the user matches the display of the operation point, and moving the line-of-sight correction range by the operation correction result information if correction by the user matches neither the display of the gaze point nor the display of the operation point.

10. The method of supporting operation according to claim 8, further comprising:

not changing, via the operation coordinate line-of-sight correction section, the coordinates of the operation point of the touch input corresponding to the correction of the display when the user corrects the display after the coordinates of the operation point are changed.

11. A non-transitory computer-readable recording medium for storing an operation support program executable by a computer, the operation support program comprising:

a first program code that causes the computer to detect coordinates of a touch input operation point on a touch panel by a user;

a second program code that causes the computer to calculate coordinates of a gaze point on the touch panel at which a line of sight of the user is directed during a specific time range from a time point of the touch input on the touch panel by the user;

a third program code that causes the computer to calculate a line-of-sight correction area in a specific range from the coordinates of the gaze point, calculated by the second program code, on the touch panel;

a fourth program code that causes the computer to change the coordinates of the operation point to the coordinates of the gaze point if the coordinates of the operation point are within the line-of-sight correction area calculated by the third program code, and not to change the coordinates of the operation point if the coordinates of the operation point are not within the line-of-sight correction area;

a fifth program code that causes the computer to display the coordinates of the operation point changed or unchanged by the fourth program code; and a sixth program code that causes the computer to modify the time range and a range of the line-of-sight correction area if the user corrects the display after the fourth program code changes the coordinates of the operation point.

12. The non-transitory computer-readable recording medium according to claim 11, the operation support program further comprising:

when the user corrects the display after the fourth program code changes the coordinates of the operation point, a seventh program code that causes the computer not to change the coordinates of the operation point of the touch input corresponding to the correction of the display.

13. A non-transitory computer-readable recording medium for storing an operation support program executable by a computer, the operation support program further comprising:

a first program code that causes the computer to detect coordinates of a touch input operation point on a touch panel by a user;

a second program code that causes the computer to calculate coordinates of a gaze point on the touch panel at which a line of sight of the user is directed during a specific time range from a time point of the touch input on the touch panel by the user;

a third program code that causes the computer to calculate a line-of-sight correction area in a specific range from the coordinates of the gaze point, calculated by the second program code, on the touch panel;

a fourth program code that causes the computer to change the coordinates of the operation point to the coordinates of the gaze point if the coordinates of the operation point are within the line-of-sight correction area calculated by the third program code, and not to change the coordinates of the operation point if the coordinates of the operation point are not within the line-of-sight correction area;

a fifth program code that causes the computer to hold the coordinates of the operation point, the coordinates of the gaze point, and a result of changing the coordinates of the operation point by the fourth program code as operation correction result information;

a sixth program code that causes the computer to display the coordinates of the operation point changed or unchanged by the fourth program code; and a seventh program code that causes the computer to refer to the operation correction result information held by the fifth program code, and to modify the time range and a line-of-sight correction range if correction of the display by the sixth program code is detected after changing the coordinates of the operation point by the fourth program code, wherein the third program code causes the computer to calculate the line-of-sight correction area corresponding to the line-of-sight correction range from the coordinates of the gaze point on the touch panel, calculated by the second program code.

14. The non-transitory computer-readable recording medium according to claim 13, wherein the seventh program code causes the computer to, expand the line-of-sight correction range if correction by the user matches the display of the gaze point, contract the line-of-sight correction range if correction by the user matches the display of the operation point, and move the line-of-sight correction range by the operation correction result information if correction by the user matches neither the display of the gaze point nor the display of the operation point.

15. The non-transitory computer-readable recording medium according to claim 13, further comprising, when the user corrects the display after the coordinates of the operation point are changed, an eighth program code that causes the computer not to change the coordinates of the operation point of the touch input corresponding to correction of the display.

* * * * *